United States Patent
Anderson et al.

(10) Patent No.: US 8,494,731 B2
(45) Date of Patent: Jul. 23, 2013

(54) METHOD OF CONTROLLING GEAR RATIO RATE OF CHANGE IN CONTINUOUSLY VARIABLE TRANSMISSION

(75) Inventors: Randall Todd Anderson, Peoria, IL (US); Bradley John Will, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 13/303,280

(22) Filed: Nov. 23, 2011

(65) Prior Publication Data

US 2013/0126257 A1  May 23, 2013

(51) Int. Cl.
*G06F 7/00* (2006.01)

(52) U.S. Cl.
USPC ............................................ 701/51; 180/338

(58) Field of Classification Search
USPC ................... 701/51; 180/338, 65.25; 475/72, 475/76, 80, 83, 207
See application file for complete search history.

(56) References Cited

U.S. PATENT DOCUMENTS

| | | | |
|---|---|---|---|
| 4,103,489 A | 8/1978 | Fletcher et al. | |
| 4,226,295 A | 10/1980 | Rembold et al. | |
| 4,353,272 A | 10/1982 | Schneider et al. | |
| 4,509,125 A | 4/1985 | Fattic et al. | |
| 4,641,553 A | 2/1987 | Kobayashi | |
| 5,474,505 A | 12/1995 | Seidel et al. | |
| 5,636,119 A | 6/1997 | Coutant et al. | |
| 5,860,891 A | 1/1999 | Bauerle | |
| 5,947,862 A | 9/1999 | Knapp et al. | |
| 6,157,884 A | 12/2000 | Narita et al. | |
| 6,361,471 B1 | 3/2002 | Heed | |
| 6,442,467 B1 | 8/2002 | Schuler et al. | |
| 6,487,485 B1 | 11/2002 | Henneken et al. | |
| 6,575,871 B2 | 6/2003 | Loeffler et al. | |
| 6,813,551 B2 | 11/2004 | Taniguchi et al. | |
| 6,814,687 B2 | 11/2004 | Jager et al. | |
| 6,957,139 B2 | 10/2005 | Bellinger | |
| 7,416,512 B2 | 8/2008 | Kobayashi et al. | |
| 7,574,295 B2 | 8/2009 | Frances | |
| 2009/0088938 A1 | 4/2009 | Usukura | |
| 2009/0149296 A1 | 6/2009 | Eastman et al. | |
| 2010/0087993 A1* | 4/2010 | Roli et al. | 701/51 |
| 2011/0048829 A1 | 3/2011 | Matsumoto et al. | |

FOREIGN PATENT DOCUMENTS

| | | |
|---|---|---|
| JP | 63022737 | 1/1988 |
| KR | 100507071 | 8/2005 |

* cited by examiner

*Primary Examiner* — Thomas Black
*Assistant Examiner* — Luke Huynh
(74) *Attorney, Agent, or Firm* — Liell & McNeil

(57) ABSTRACT

A method is provided for controlling a gear ratio rate of change in a machine having a continuously variable transmission. The method includes moving an operator input device to a changed position, receiving electronic data indicative of the changed position, and determining a non-limited desired gear ratio based at least in part on the changed position. A maximum gear ratio rate of change corresponding to the changed position is selected from an electronically stored gear ratio rate map. A current desired gear ratio is determined based at least in part on the non-limited desired gear ratio and the maximum gear ratio rate of change. The method also includes changing a commanded gear ratio of the continuously variable transmission to the current desired gear ratio using electronic signals.

20 Claims, 6 Drawing Sheets

US 8,494,731 B2

METHOD OF CONTROLLING GEAR RATIO RATE OF CHANGE IN CONTINUOUSLY VARIABLE TRANSMISSION

TECHNICAL FIELD

The present disclosure relates generally to a control system and method for a machine having a continuously variable transmission, and more particularly to a control system and method for limiting a gear ratio rate of change in the machine.

BACKGROUND

Many machines, including off-highway machines, are known to use continuously variable transmissions to drive the ground engaging elements, such as wheels or tracks, of the machine. For example, a hydrostatic drive system commonly includes at least one pump driven by a prime mover, such as an internal combustion engine, of the machine. The pump may be configured to drive one or more sets of motors, which, in turn, power the ground engaging elements of the machine. The pump, and/or motors, may provide variable displacement, such that a fluid flow between the components of the hydrostatic drive system may be adjusted while the machine is running. As a result, direction, speed, and torque of the drive wheels may be continuously varied.

During a typical work cycle, an operator may choose to quickly change the direction, speed, and/or torque, as permitted by the hydrostatic drive system, in order to maximize efficiency in performance of the work cycle. For example, an operator may wish to drive toward a pile of materials at maximum speed, pick up a load of the materials, and quickly reverse away from the pile in order to transport the load to a new location. However, if the operator commands the hydrostatic drive system to accelerate, decelerate, or change directions too quickly, the components of the hydrostatic drive system may not be capable of such quick transitions and, as a result, the machine may jerk or lug. This sacrifice of smoothness for speed may result in a reduction of efficiency caused by, for example, discomfort and fatigue of the operator and/or spilling a portion of the load. Thus, operators may desire a balance of quick responsiveness of the hydrostatic drive system with smoothness in transitions of the hydrostatic drive system. U.S. Pat. No. 6,575,871 to Loeffler et al. teaches a method for controlling an adjusting speed of a shift operation in a continuously variable transmission. Specifically, Loeffler et al. appears to show the division of a shift operation into individual periods. During each period, a desired transmission ratio change is multiplied by a gradient, which is determined in dependence upon various influence quantities, to result in a dynamic desired transmission ratio. The current gear ratio is then transitioned to the dynamic desired transmission ratio at a constant adjusting speed.

The present disclosure is directed to one or more of the problems or issues set forth above.

SUMMARY OF THE DISCLOSURE

In one aspect, a method is provided for controlling a gear ratio rate of change in a machine that includes a continuously variable transmission. The method includes moving an operator input device to a changed position, receiving electronic data indicative of the changed position, and determining a non-limited desired gear ratio based at least in part on the changed position. A maximum gear ratio rate of change corresponding to the changed position is selected from an electronically stored gear ratio rate map. A current desired gear ratio is determined based at least in part on the non-limited desired gear ratio and the maximum gear ratio rate of change. The method also includes changing a commanded gear ratio of the continuously variable transmission to the current desired gear ratio using electronic signals.

In another aspect, a machine having a continuously variable transmission includes ground engaging propulsion elements coupled with a machine frame, and an internal combustion engine supported on the machine frame. A continuously variable transmission is coupled with the internal combustion engine and is configured to drive the ground engaging propulsion elements. A gear ratio rate map mapping maximum gear ratio rates of change to positions of an operator input device of the machine is stored in a memory. An electronic controller includes the memory and is in communication with the operator input device and the continuously variable transmission. The electronic controller receives electronic data indicative of a changed position of the operator input device and determines a non-limited desired gear ratio. The electronic controller also selects a maximum gear ratio rate of change corresponding to the changed position from the gear ratio rate map and determines a current desired gear ratio based at least in part on the non-limited desired gear ratio and the maximum gear ratio rate of change. A commanded gear ratio of the continuously variable transmission is changed to the current desired gear ratio using electronic signals.

DETAILED DESCRIPTION

Figure 1:
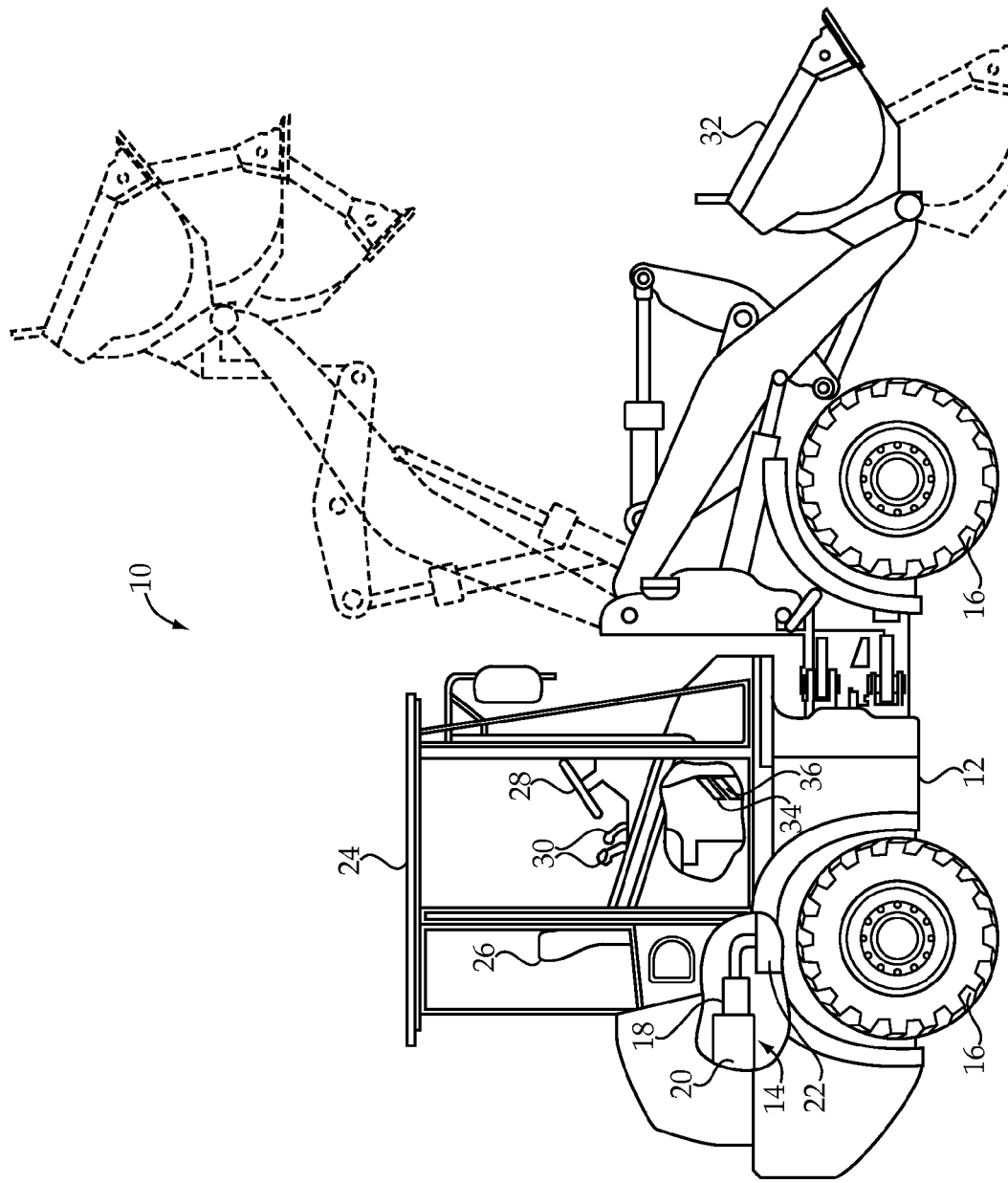
FIG. 1 is a side diagrammatic view of a machine having a continuously variable transmission, according to the present disclosure.

An exemplary embodiment of a machine 10 is shown generally in FIG. 1. The machine 10 may be a wheel loader, as shown, or any other off-highway or on-highway vehicle having a continuously variable transmission. Although the application is widely applicable to any machine having a continuously variable transmission, a machine having a hydrostatic drive system is shown. As such, machine 10 may also be referenced herein as a hydrostatic drive machine or, more specifically, a hydrostatic drive wheel loader. In the illustrated embodiment, machine 10 generally includes a frame 12 having a hydrostatic drive system 14 supported thereon for driving ground engaging elements 16, such as wheels (shown) or tracks, of the machine 10. A strategy presented herein for controlling the hydrostatic drive system 14 may be widely applicable to a machine having any continuously variable transmission and, therefore, it should be appreciated that the specific embodiments provided are presented for exemplary purposes only.

The hydrostatic drive system 14 may generally include at least one pump 18, such as a hydraulic pump, driven by a prime mover, such as a compression or spark-ignited internal combustion engine 20 or electric motor, of the machine 10. The pump 18 may be configured to drive at least one motor 22, such as one or more sets of hydraulic motors, which, in turn, power the ground engaging elements 16 of the machine 10. Each of the pump 18 and motor 22 may provide variable displacement, such that a fluid flow between the components of the hydrostatic drive system 14 may be adjusted while the machine 10 is running. As a result, direction, speed, and torque of the ground engaging elements 16, or wheels, may be continuously varied.

An operator control station 24 may also be supported on the frame 12 and may include various controls and devices that may be used by an operator of the machine 10. For example, the operator control station 24 may include known devices, such as a seat assembly 26, a steering device 28, and one or more machine operation controllers 30. According to a specific example, a first machine operation controller 30 may be provided for controlling directional movement of the machine 10, while a second machine operation controller 30 may be provided for controlling operation of an implement 32, such as a bucket, of the machine 10. The operator control station 24 may include additional machine controllers, such as an accelerator pedal 34 for controlling engine speed, gear ratio, and rim pull, and a decelerator pedal 36 for reducing gear ratio and rim pull. According to some embodiments, and as will be described below, the decelerator pedal 36 may also function as a service brake. Although separate controls are described for controlling direction of travel and speed of the machine 10, it should be appreciated that a single control, such as a lever, may be provided for controlling both machine speed and travel direction.

Figure 2:
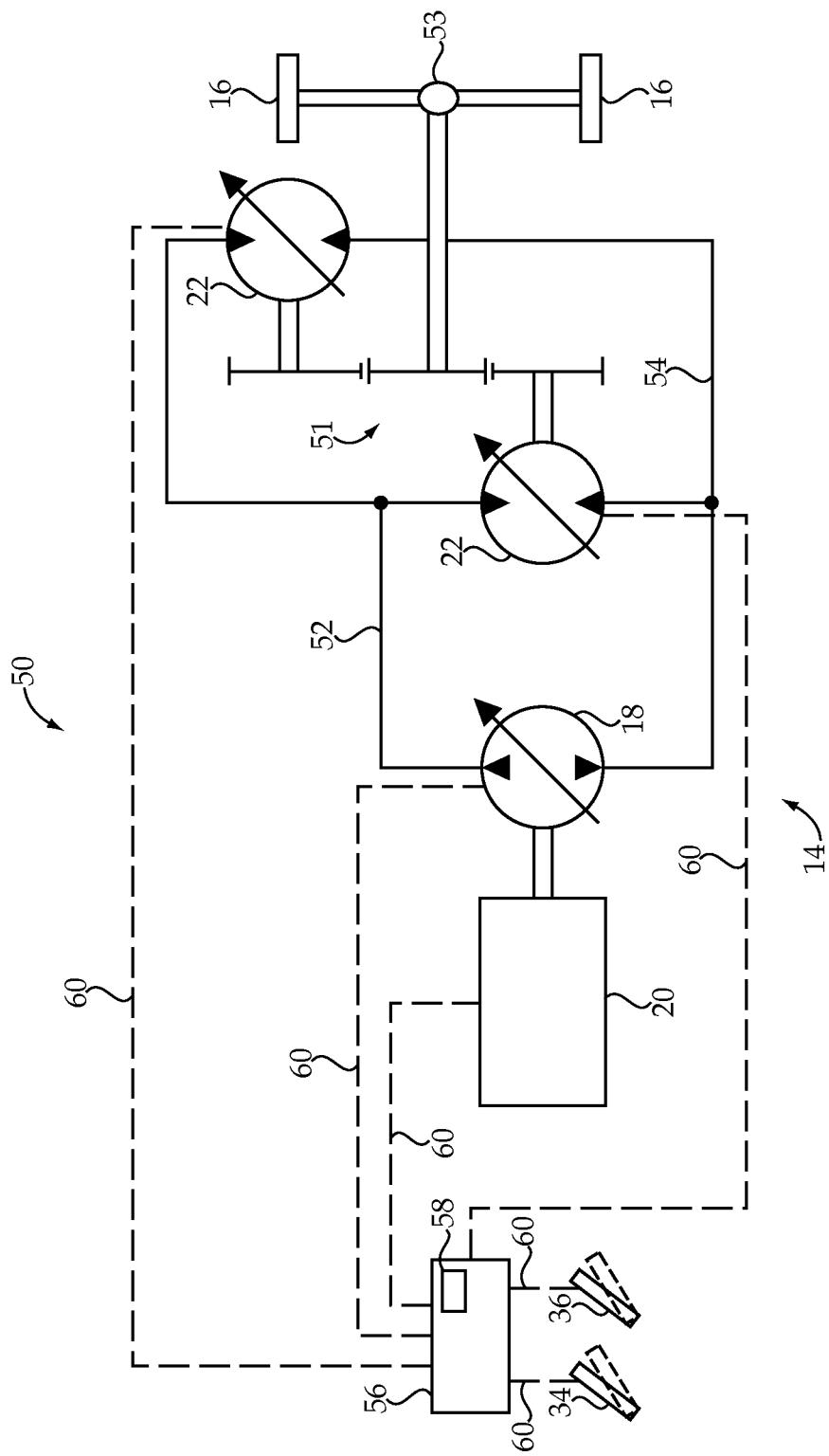
FIG. 2 is a schematic of a hydrostatic drive system of the machine of FIG. 1, according to one embodiment of the present disclosure.

A specific embodiment of the hydrostatic drive system 14 is shown in FIG. 2 to further describe a control system 50 of the hydrostatic drive machine 10. As shown, the hydrostatic drive system 14 may include at least one variable displacement pump 18 mechanically coupled to the internal combustion engine 20. The variable displacement pump 18 may include a bi-directional variable displacement swash plate pump, such that adjustment of the swash plate of the pump 18 may adjust the displacement thereof. It should be appreciated that the term "bi-directional" may refer to a pump that is capable of pumping fluid, such as hydraulic fluid, in either of two directions. As such, the angle of the swash plate may vary between first, or positive, displacement orientations, such as for forward travel of the machine 10, and second, or negative, displacement orientations, such as for reverse travel of the machine 10. It should be appreciated that a zero displacement, or swash plate angle of zero, may result in the pump 18 displacing no fluid while rotating and, thus, not driving the machine 10.

According to the exemplary embodiment, the variable displacement pump 18 may be fluidly coupled, such as in parallel, to a pair of variable displacement motors 22. It should be appreciated that the fluid coupling of the variable displacement motors 22 to the variable displacement pump 18 may allow the relative swash plate angle of the pump 18 to determine the direction and flow rate of the hydraulic fluid that is pumped to each motor 22. In addition, the displacements of the motors 22 may be similarly varied, by adjusting swash plate angles, between minimum and maximum displacements to adjust a torque delivered to the ground engaging elements 16. The motors 22, as should be appreciated, may not be bi-directional, as described with reference to the pump 18. However, bi-directional motors may also be used without deviating from the scope of the present disclosure.

As shown, each of the variable displacement motors 22 may be drivingly coupled with one of the ground engaging elements 16. More specifically, each of the variable displacement motors 22 may be configured to drive an axle shaft, which, in turn, may be configured to drive a gear mechanism 51. The gear mechanism 51 may be drivingly coupled with the ground engaging elements 16 through a differential 53. Therefore, pumping hydraulic fluid from the variable displacement pump 18 to the variable displacement motors 22 through a first set of fluid lines 52 may drive the ground engaging elements 16 in a first, or forward, direction. The speed and torque, as should be appreciated, may be dependent upon the selected displacements of the respective pump 18 and motors 22. Pumping fluid in the opposite direction, through a second set of fluid lines 54, may drive the ground engaging elements 16 in a second, or reverse, direction at a speed and torque determined by the displacements of the pump 18 and motors 22.

The control system 50, referenced above, may include at least one electronic controller 56 configured to control operation of the hydrostatic drive system 14. As such, the electronic controller 56 may also be referenced herein as a drive system electronic controller. Although a single electronic controller 56 is described, it should be appreciated that the control system 50 may include a plurality of electronic controllers. For example, an additional electronic controller may be provided for controlling operation of the internal combustion engine 20. As such, each electronic controller of the control system 50 may be configured to communicate laterally and/or in a hierarchical manner. Therefore, it should be appreciated that a variety of control systems 50, ranging from simple to complex, are contemplated for use with the present disclosure.

The electronic controller 56 may be of standard design and may include a processor, such as, for example, a central processing unit, a memory 58, and an input/output circuit that facilitates communication internal and external to the electronic controller 56. The processor may control operation of the electronic controller 56 by executing operating instructions, such as, for example, computer readable program code stored in memory 58, wherein operations may be initiated internally or externally to the electronic controller 56. A control scheme, an example of which is provided below, may be utilized that monitors outputs of systems or devices, such as, for example, sensors, actuators, or control units, via the input/output circuit to control inputs to various other systems or devices.

The memory 58 may comprise temporary storage areas, such as, for example, cache, virtual memory, or random access memory, or permanent storage areas, such as, for example, read-only memory, removable drives, network/internet storage, hard drives, flash memory, memory sticks, or any other known volatile or non-volatile data storage devices. Such devices may be located internally or externally to the electronic controller 56. One skilled in the art will appreciate that any computer based system or device utilizing similar components for controlling the components of the hydrostatic drive system 14, is suitable for use with the present disclosure.

According to the exemplary embodiment, the electronic controller 56 may be in communication with at least the variable displacement pump 18 and the variable displacement motors 22. More specifically, for example, the electronic controller 56 may be in communication with the variable displacement pump 18 to adjust the swash plate angle thereof, resulting in the variable displacement described above. According to one embodiment, a pump displacement solenoid, such as a proportional solenoid, may be provided for varying the swash plate angle and controlling the direction of fluid flow. However, various means for adjusting displacement and fluid flow are known and may be incorporated into the present disclosure. Accordingly, the electronic controller 56 may issue pump displacement commands and/or additional commands, via wired or wireless communication lines 60, to the variable displacement pump 18 to effectively control the displacement and direction of fluid flow of the variable displacement pump 18.

Similarly, the electronic controller 56 may be in communication with the variable displacement motors 22 to adjust angles of the swash plates of the motors 22. Specifically, the electronic controller 56 may issue motor displacement commands via communication lines 60 to control the displacement of the respective variable displacement motors 22. Controlling the displacement of the variable displacement motors 22, using proportional solenoids or other similar devices, may allow for further speed adjustment and/or torque adjustment, as necessary to propel the hydrostatic drive machine 10. As stated above, devices for controlling displacement and fluid flow are generally known and, therefore, will not be discussed herein in greater detail.

The electronic controller 56 may also be in communication with the internal combustion engine 20 to control a speed thereof, such as, for example, by issuing control commands via communication lines 60 to control fueling to the internal combustion engine 20. The engine speed may be adjusted, at least in part, based on a position of the accelerator pedal 34. Thus, the electronic controller 56 also communicates with the accelerator pedal 34 via communication lines 60 to detect or monitor a position, such as an actuation amount, of the pedal 34. Positions of the decelerator pedal 36 are also monitored by the electronic controller 56 via communication lines 60 and used, along with additional inputs including the accelerator pedal 34, to control ground speed of the hydrostatic drive machine 10. It should be appreciated that the control system 50 may include additional components and devices and may monitor additional inputs to control the hydrostatic drive system 14 as described herein.

Figure 3:
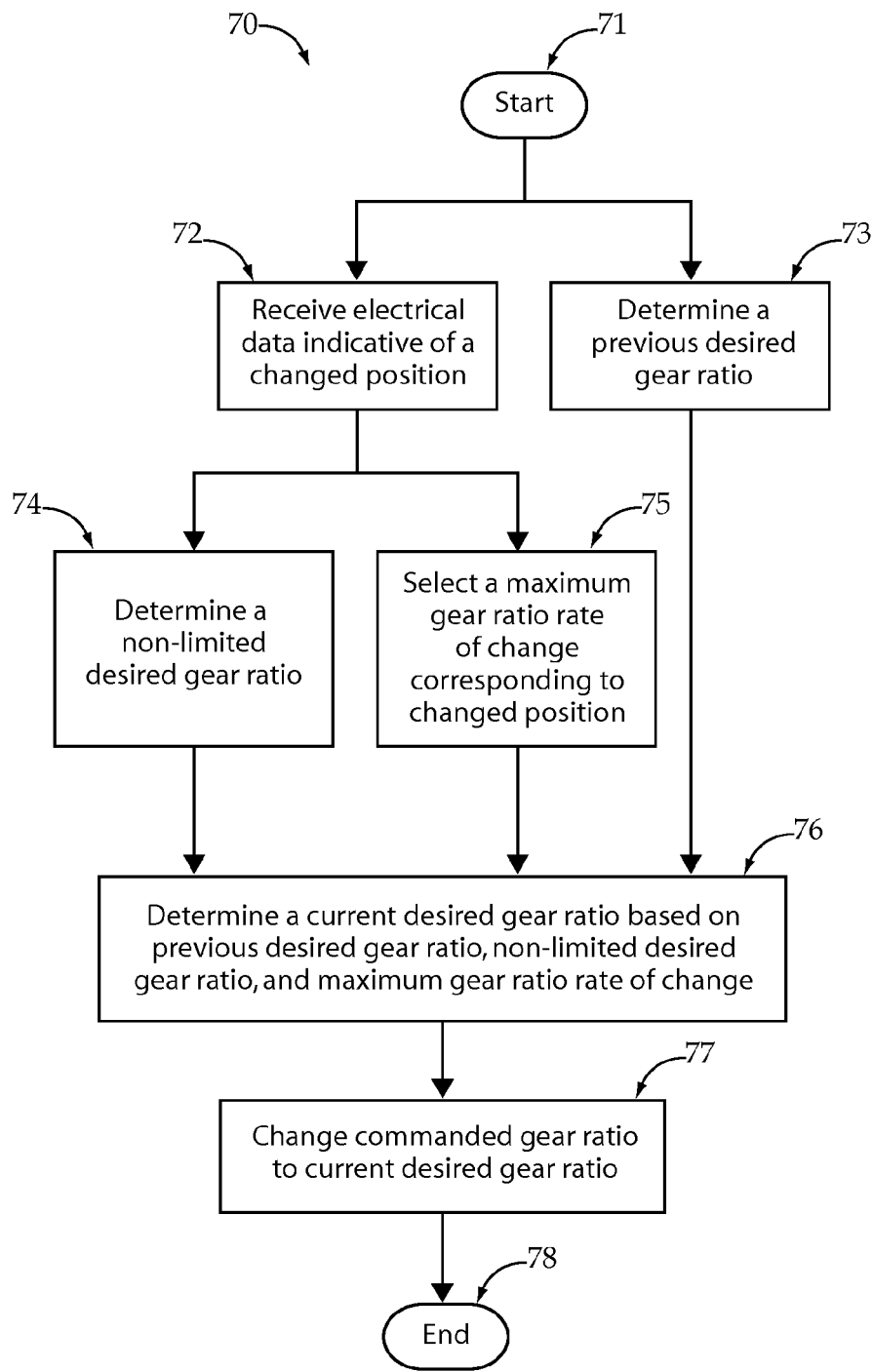
FIG. 3 is a logic flow chart of one embodiment of a method for controlling a gear ratio rate of change in the hydrostatic drive machine of FIG. 1, according to one aspect of the present disclosure.

Turning to FIG. 3, there is shown a flow chart 70 representing an exemplary method for controlling an effective gear ratio rate of change in the hydrostatic drive machine 10 according to the present disclosure. The method may be implemented by the control system 50 of the machine 10. According to one example, the steps implementing the disclosed method may be in the form of computer readable program code stored in the memory 58 and executed by a processor of the electronic controller 56, or other computer usable medium. The method may run continuously or may be initiated in response to a predetermined event. According to one embodiment, the method may be initiated in response to a detected movement of one or both of the accelerator pedal 34 and the decelerator pedal 36. However, it should be appreciated that the electronic controller 58 may continuously monitor the positions of the accelerator pedal 34 and decelerator pedal 36, but some gear ratio changes may only occur when the operator requests such changes, such as by actuating one or both of the accelerator and decelerator pedals 34 and 36.

The method begins at a START, Box 71. From Box 71, the method proceeds to Box 72, which includes the electronic controller 56 receiving electronic data indicative of positions, or changed positions, of the accelerator and decelerator pedals 34 and 36. For example, if the operator actuates the accelerator pedal 34, the electronic controller 56 may detect the actuated or changed accelerator position. If the operator actuates the decelerator pedal 36, the electronic controller 56 may detect the actuated or changed decelerator position. These one or more changed positions may be used, at Box 74, to determine a non-limited desired gear ratio. The non-limited desired gear ratio, as described below, may be based at least in part on the accelerator and decelerator changed positions, and, further, may be based on a maximum allowed gear ratio. The maximum allowed gear ratio may, according to some embodiments, represent a fixed value set by the operator, such as via an operator input device. As the method proceeds from Box 71 to Box 72 and Box 74, the method also proceeds from Box 71 to Box 73 to determine a previous desired gear ratio from a previous time step of the electronic controller 56.

As used herein, and with regard to the accelerator pedal 34, depressing the accelerator pedal 34 may command or request acceleration, or an increase in gear ratio, while releasing the accelerator pedal 34 may command or request deceleration, or a decrease in gear ratio. Regarding the decelerator pedal 36, depressing the decelerator pedal 36 may command or request deceleration, while releasing the decelerator pedal 36 may command or request acceleration. Together, the accelerator and decelerator pedal positions may reflect a net increase in gear ratio or a net decrease in gear ratio. To be clear, regardless of whether or not the accelerator pedal and decelerator pedal conflict in the respective acceleration or deceleration requests, a net effect or change in gear ratio, such as acceleration or deceleration, of the hydrostatic drive system 14, will be indicated.

According to the exemplary embodiment, the decelerator pedal 36 may also be used to activate service brakes for the hydrostatic drive machine 10. For example, actuation of the decelerator pedal 36 between 0-50% actuation may control gear ratio and rim pull, while actuation of the decelerator pedal 36 between 50%-100% actuation may activate the service brakes. As used herein, "actuation" means movement, such as pivotal movement, of the accelerator and decelerator pedals 34 and 36. Each of the accelerator and decelerator pedals 34 and 36 may have a default or resting position, as shown in FIG. 2. The accelerator and decelerator pedals 34 and 36 may be depressed from the resting positions to fully actuated or depressed positions, shown in phantom, and released back to the resting positions. It should be appreciated that any operator input device capable of reflecting gear ratios requested by the operator may be substituted for the accelerator pedal 34 and decelerator pedal 36 without deviating from the scope of the present disclosure.

As the non-limited desired gear ratio is determined, a maximum gear ratio rate of change corresponding to the changed position is selected from a gear ratio rate map stored in memory 58, as indicated at Box 75. A method representing a strategy for selecting the maximum gear ratio rate of change is described below with reference to FIG. 4. After the appropriate maximum gear ratio rate of change is selected, the method proceeds to Box 76, where a current desired gear ratio is determined based at least in part on the previous desired gear ratio, the non-limited desired gear ratio, and the maximum gear ratio rate of change. Specifically, the current desired gear ratio may represent an adjustment, such as an incremental adjustment, of the previous desired gear ratio, which may be the desired gear ratio value from the previous microprocessor loop, based on the maximum gear ratio rate of change. Thus the commanded gear ratio, which may represent the final gear ratio value translated into pump and motor displacement commands, may be adjusted toward the non-limited desired gear ratio, but remains limited by the non-limited desired gear ratio.

At Box 77, the hydrostatic drive system 14 or, more specifically, a commanded gear ratio of the hydrostatic drive system 14 is then changed to the current desired gear ratio, using electronic signals, at least in part by changing a displacement of one of the variable displacement pump 18 and the at least one variable displacement motors 22. More specifically, the electronic controller 56 may change the commanded gear ratio of the hydrostatic drive system 14 to the current desired gear ratio described above by electronically controlling the components of the hydrostatic drive system 14. For example, the electronic controller 56 may use electronic signals to change displacements of the variable displacement pump 18 and/or variable displacement motors 22. According to an exemplary increase in gear ratio from a stationary position, the pump displacement may be stroked from zero displacement to maximum displacement while the motor displacement is maintained at maximum displacement. To further increase speed, the motor displacement may then be stroked from maximum displacement to zero displacement. After effecting the gear ratio change, the method proceeds to an END, at Box 78. However, as stated above, it should be appreciated that the method may run continuously and, thus, the electronic controller 56 may continuously adjust the gear ratio of the hydrostatic drive system 14.

Figure 4:
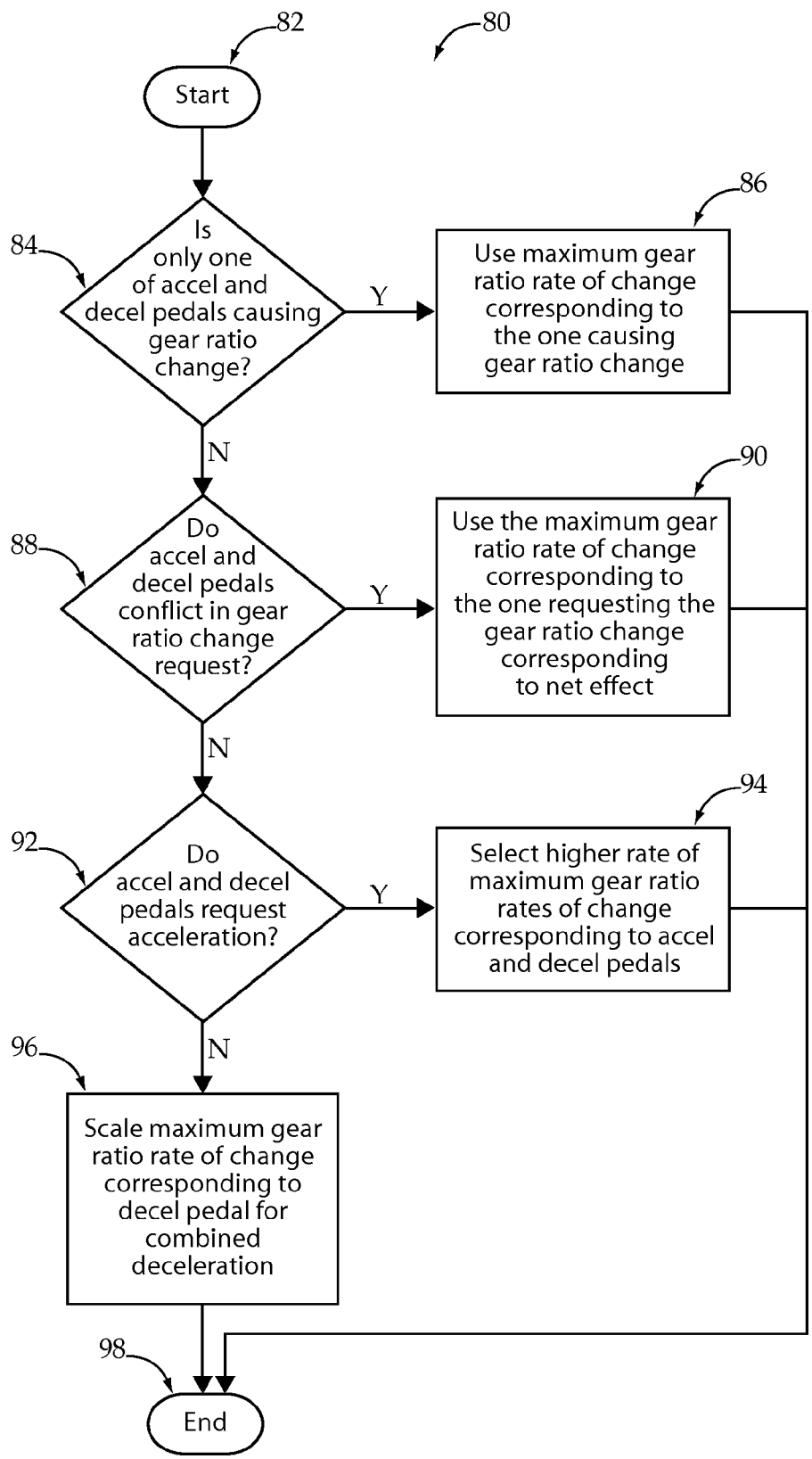
FIG. 4 is a logic flow chart of one embodiment of a method for determining maximum gear ratio rates of change for use with the method of FIG. 3, according to another aspect of the present disclosure.

Turning now to FIG. 4, there is shown a flow chart 80 representing an exemplary method for selecting the maximum gear ratio rate of change used in the method of FIG. 3. The method begins at a START, Box 82. From Box 82, the method proceeds to Box 84, where the electronic controller 56 determines if only one of the accelerator pedal 34 and the decelerator pedal 36 is commanding or requesting a gear ratio change. A gear ratio change may be one of an increase in gear ratio, or acceleration, or a decrease in gear ratio, or deceleration. According to a specific example, acceleration may be indicated if the non-limited desired gear ratio is greater than the previous desired gear ratio, while deceleration may be indicated if the non-limited desired gear ratio is less than the previous desired gear ratio.

If only one of the accelerator and decelerator pedals 34 and 36 is commanding the gear ratio change, a maximum gear ratio rate of change corresponding to the pedal 34 or 36 commanding the change is selected from memory 58, as indicated at Box 86. For example, if the electronic controller 56 determines that the accelerator pedal 34 is the only one of the accelerator pedal 34 and decelerator pedal 36 requesting the change in gear ratio, then the electronic controller 56 will use a maximum gear ratio rate of change corresponding to the accelerator pedal 34 or, more specifically, the position of the accelerator pedal 34. Similarly, if the decelerator pedal 36 is the only one of the accelerator and decelerator pedals 34 and 36 requesting the change in gear ratio, either acceleration or deceleration, then the electronic controller 56 will select a maximum gear ratio rate of change corresponding to the position of the decelerator pedal 36. The maximum gear ratio rates of change stored in memory 58 will be discussed below in greater detail.

If it is determined that more than one of the accelerator and decelerator pedals 34 and 36 is commanding the gear ratio change, the electronic controller 56 determines, at Box 88, if both of the pedals 34 and 36 conflict in their change requests. Specifically, if one of the accelerator and decelerator pedals 34 and 36 is commanding acceleration and the other of the accelerator and decelerator pedals 34 and 36 is commanding deceleration, the electronic controller 56 will select a maximum gear ratio rate of change from memory 58 corresponding to the one of the accelerator and decelerator pedals 34 and 36 commanding a gear ratio change corresponding to the net effect, as shown at Box 90. Thus, if the accelerator pedal 34 commands acceleration and the decelerator pedal 36 commands deceleration and the net effect, i.e., the combined gear ratio change that is requested, is acceleration, the electronic controller 56 will select a maximum gear ratio rate of change corresponding to the accelerator pedal 34, since the accelerator pedal 34 is commanding acceleration.

If, however, it was determined at Box 88 that both of the accelerator and decelerator pedals 34 and 36 do NOT conflict in their change requests, i.e., both pedals 34 and 36 request acceleration or both pedals 34 and 36 request deceleration, the method proceeds to Box 92. At Box 92, the method determines if both of the accelerator pedal 34 and the decelerator pedal 36 request acceleration. If both pedals 34 and 36 are commanding acceleration, the electronic controller 56 will select a higher rate of the maximum gear ratio rate of change corresponding to the accelerator pedal 34 and the maximum gear ratio rate of change corresponding to the decelerator pedal 36. The higher rate, selected at Box 94, will then be used to adjust the previous desired gear ratio and arrive at the current desired gear ratio.

If both of the accelerator pedal 34 and the decelerator pedal 36 are commanding deceleration, the electronic controller 56, at Box 96, may select the maximum rate of change corresponding to the decelerator pedal 36 for combined deceleration. After an appropriate maximum gear ratio rate of change is selected based on the position of one or both of the accelerator pedal 34 and the decelerator pedal 36, the method proceeds to an END, at Box 98.

Figure 5:
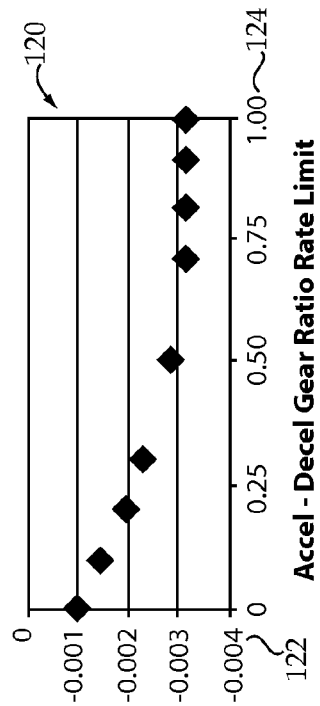
FIG. 5 is a graph of maximum gear ratio rate of change for acceleration versus accelerator pedal position, according to another aspect of the present disclosure.
Figure 6:
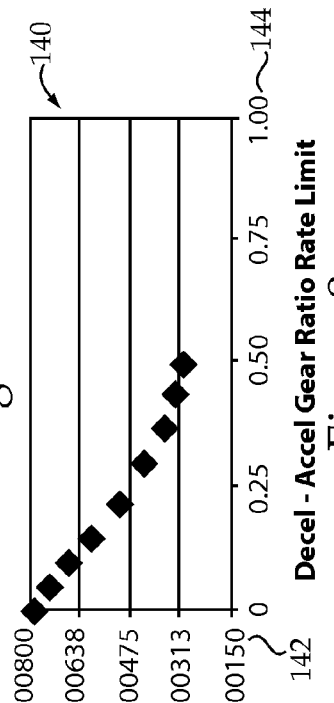
FIG. 6 is a graph of maximum gear ratio rate of change for deceleration versus accelerator pedal position, according to another aspect of the present disclosure.

Maximum gear ratio rates of change, as referenced above, may be stored in memory 58 and may be provided for acceleration and deceleration gear ratio changes for each of the accelerator and decelerator pedals 34 and 36. For example, maximum gear ratio rates of change for the accelerator pedal 34 may be provided for a requested increase in gear ratio, or acceleration, and a requested decrease in gear ratio, or deceleration. Exemplary maximum gear ratio rates of change for acceleration, corresponding to the accelerator pedal 34, are shown in FIG. 5. Specifically, FIG. 5 depicts a graph 110 of maximum gear ratio rates of change 112, shown in gear ratio change per microprocessor loop time, for acceleration versus accelerator pedal position 114, shown in percentage of actuation. As shown, the maximum gear ratio rates of change for acceleration increase as the accelerator pedal 34 is depressed. Regarding deceleration, FIG. 6 depicts a graph 120 of maximum gear ratio rates of change 122 for deceleration versus accelerator pedal position 124. As shown, the maximum gear ratio rates of change for deceleration decrease as the accelerator pedal 34 is released.

Figure 7:
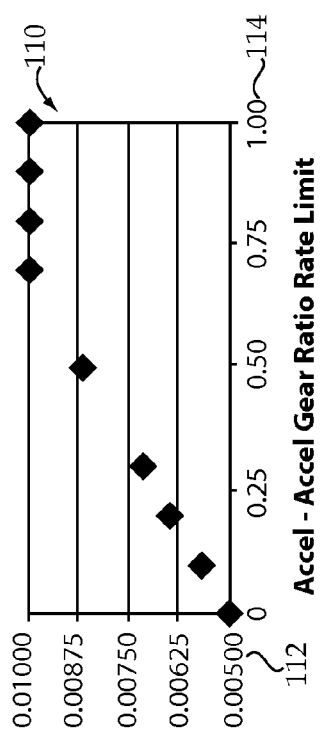
FIG. 7 is a graph of maximum gear ratio rate of change for deceleration versus decelerator pedal position, according to another aspect of the present disclosure.
Figure 8:
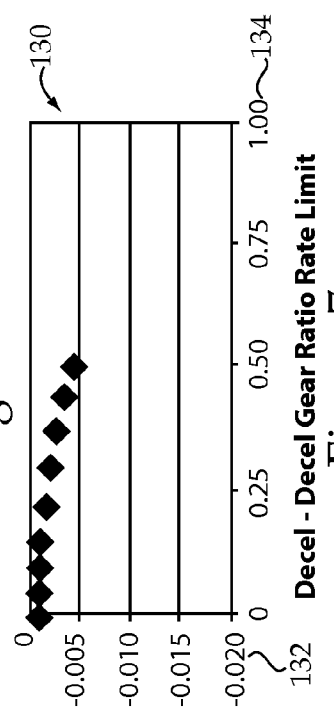
FIG. 8 is a graph of maximum gear ratio rate of change for acceleration versus decelerator pedal position, according to another aspect of the present disclosure.
Figure 9:
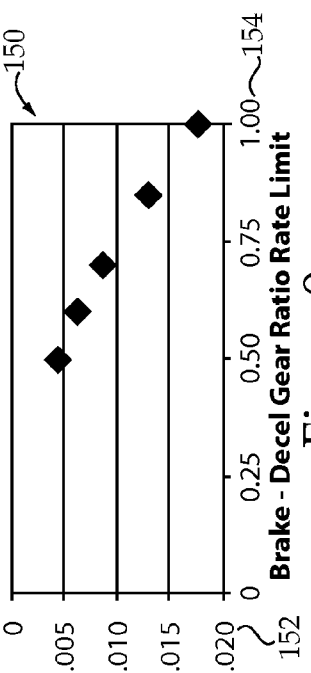
FIG. 9 is a graph of maximum gear ratio rate of change for deceleration versus service brake position, according to another aspect of the present disclosure.

Exemplary maximum gear ratio rates of change for the decelerator pedal 36 are shown in FIG. 7. Specifically, FIG. 7 depicts a graph 130 of maximum gear ratio rates of change 132 for deceleration versus decelerator pedal position 134. As shown, the maximum gear ratio rates of change for deceleration increase as the decelerator pedal 36 is depressed. FIG. 8 depicts a graph 140 of maximum gear ratio rates of change 142 for acceleration versus decelerator pedal position 144. As shown, the maximum gear ratio rates of change for acceleration increase as the decelerator pedal 36 is released. Maximum gear ratio rates of change for deceleration, corresponding to the service brake portion (i.e., 50%-100% actuation or depression) of the decelerator pedal 36, are shown in FIG. 9. Specifically, FIG. 9 depicts a graph 150 of maximum gear ratio rates of change 152 for deceleration versus decelerator pedal position 154.

Figure 10:
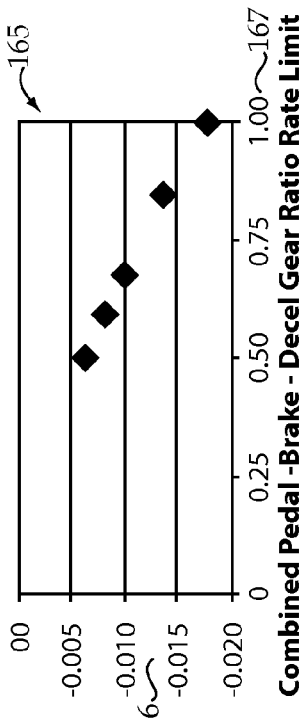
FIG. 10 is a graph of maximum gear ratio rate of change versus decelerator pedal position for combined deceleration, according to another aspect of the present disclosure.
Figure 11:
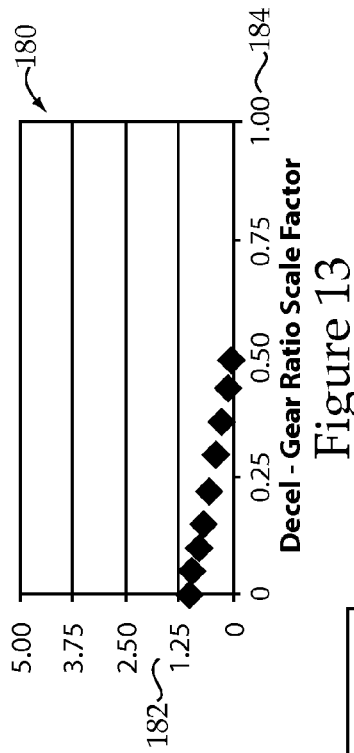
FIG. 11 is a graph of maximum gear ratio rate of change versus service brake position for combined deceleration, according to another aspect of the present disclosure.

As stated above, if both of the accelerator pedal 34 and the decelerator pedal 36 are commanding deceleration, the electronic controller 56, may select the maximum rate of change corresponding to the position of the decelerator pedal 36 for combined deceleration. This rate corresponding to the decelerator pedal 36 is shown in FIG. 10, and may differ from the maximum rate of change values shown in FIG. 7. Specifically, FIG. 10 depicts a graph 160 of maximum gear ratio rates of change 162 for combined deceleration versus decelerator pedal position 164. FIG. 11, which may have values that differ from the values of FIG. 9, depicts a graph 165 of maximum gear ratio rates of change 166 for combined deceleration versus decelerator pedal position 167, where the position corresponds to the service brake portion (i.e., 50%-100% actuation or depression) of the decelerator pedal 36. This rate of change may be used to arrive at desirable deceleration gear ratio rate limits when both of the accelerator and decelerator pedals 34 and 36 are commanding deceleration.

Figure 12:
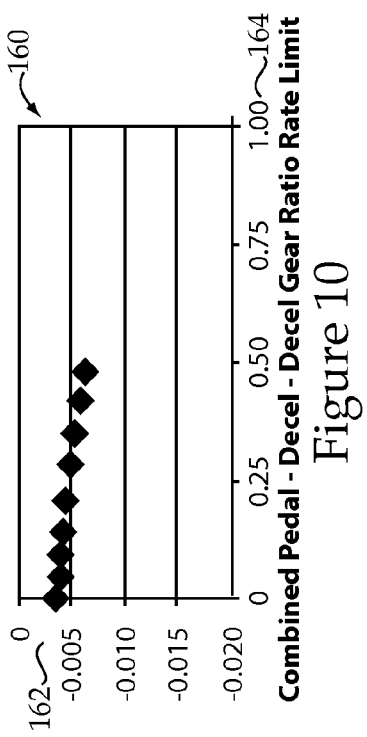
FIG. 12 is a graph of scale factor versus accelerator pedal position, according to another aspect of the present disclosure.
Figure 13:
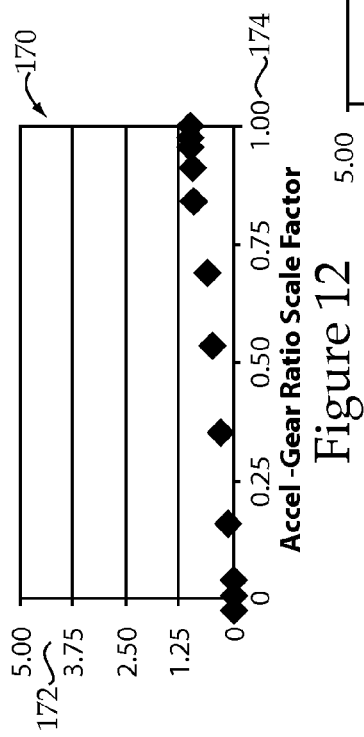
FIG. 13 is a graph of scale factor versus decelerator pedal position, according to another aspect of the present disclosure.
Figure 14:
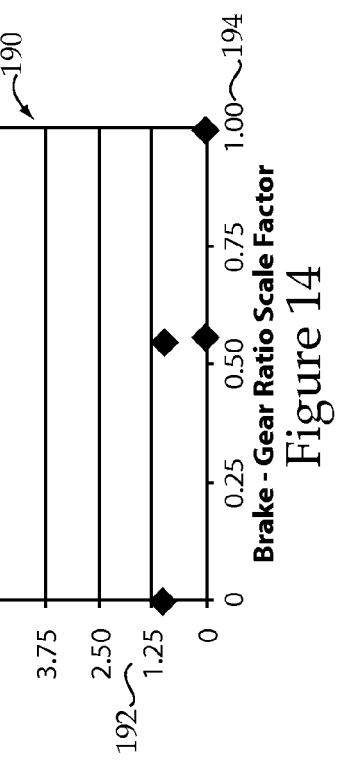
FIG. 14 is a graph of scale factor versus service brake position, according to another aspect of the present disclosure.

FIGS. 12-14 show exemplary scale factors that may be used to arrive at the non-limited desired gear ratio described above. For example, scale factors corresponding to positions of the accelerator pedal 34 and the decelerator pedal 36, including the service brake portion of the decelerator pedal 36, may be used to determine the non-limited desired gear ratio. More specifically, the scale factors may adjust a maximum allowed gear ratio value to determine the non-limited desired gear ratio. FIG. 12 depicts a graph 170 of scale factor 172 versus accelerator pedal position 174; FIG. 13 depicts a graph 180 of scale factor 182 versus decelerator pedal position 184; and FIG. 14 depicts a graph 190 of scale factor 192 versus the service brake portion of the decelerator pedal position 194.

According to some embodiments, it may be desirable to provide error scaling. For example, the maximum gear ratio rates may be scaled based on a difference between the non-limited desired gear ratio and the previous desired gear ratio. More specifically, as the values get closer together or farther apart, a scale factor may be produced that adjusts the maximum gear ratio rates of change. Of course, alternative means for error correction, which may further smooth a transition from the previous desired gear ratio to the non-limited desired gear ratio, may also be incorporated into the control strategy provided herein.

It should be appreciated that the methods described herein are provided to describe an exemplary control strategy and, thus, implementation details may vary greatly depending on the particular application. Further, it should be appreciated that specific values provided herein, such as values corresponding to the maximum gear ratio rates of change and scale factors, are provided for exemplary purposes only. Such values may be arrived at through testing and, further, may be selected to provide desired performance characteristics. According to a specific embodiment, it may be desirable to select values that simulate torque converter operation. That is, for example, desirable performance may include, for example, increasing a rate of change in deceleration as the decelerator pedal 36 is further depressed. Further, desirable performance may include decreasing a rate of change in deceleration as the accelerator pedal 34 is further released.

INDUSTRIAL APPLICABILITY

The present disclosure finds potential application in any machine that utilizes a continuously variable transmission. Further, the disclosure may be specifically applicable to hydrostatic drive machines utilizing one or more variable displacement pumps configured to drive one or more variable displacement motors. Yet further, the present disclosure may be applicable to control strategies for changing gear ratios in hydrostatic drive machines. Such machines may include, but are not limited to, off-highway machines, such as wheel loaders, and other machines known in the art.

Referring generally to FIGS. 1-14, a hydrostatic drive machine 10 may include a hydrostatic drive system 14 including at least one variable displacement pump 18 mechanically coupled to an internal combustion engine 20. The variable displacement pump 18 may be fluidly coupled to a pair of variable displacement motors 22, which, in turn, are drivingly coupled with ground engaging elements 16 of the machine 10 via a gear mechanism 51 and differential 53. A control system 50, including at least one electronic controller 56, may be provided for controlling operation of the hydrostatic drive system 14, including executing methods for controlling a gear ratio rate of change and selecting maximum gear ratio rates of change.

During typical operation of the hydrostatic drive machine 10, the operator may move an accelerator pedal 34 to an accelerator changed position and/or a decelerator pedal 36 to a decelerator changed position. The electronic controller 56 may receive electronic data indicative of the one or more changed positions and, using at least that information, may determine a non-limited desired gear ratio. The strategy described above with reference to FIG. 4 may be used to select a maximum gear ratio rate of change corresponding to the accelerator and/or decelerator changed positions.

Specifically, if only one of the accelerator and decelerator pedals 34 and 36 is commanding the gear ratio change, a maximum gear ratio rate of change corresponding to a position of the pedal 34 or 36 commanding the change is selected from memory 58. If it is determined that more than one of the accelerator and decelerator pedals 34 and 36 is commanding the gear ratio change, the electronic controller 56 determines if both of the pedals 34 and 36 conflict in their change requests. Specifically, if one of the accelerator and decelerator pedals 34 and 36 is commanding acceleration and the other of the accelerator and decelerator pedals 34 and 36 is commanding deceleration, the electronic controller 56 will select a maximum gear ratio rate of change from memory 58 corresponding to the one of the accelerator and decelerator pedals 34 and 36 commanding a gear ratio change corresponding to the net effect. If both pedals 34 and 36 are commanding acceleration, the electronic controller 56 will select the higher rate of the maximum rate of change corresponding to the accelerator changed position and the maximum rate of change corresponding to the decelerator changed position. If both of the accelerator pedal 34 and the decelerator pedal 36 are commanding deceleration, the electronic controller 56 may select the maximum rate of change corresponding to the decelerator pedal 36 for combined deceleration.

After the appropriate maximum gear ratio rate of change, which may include the higher rate or the combined rate described above, is selected, a current desired gear ratio is determined based at least in part on the previous desired gear ratio, the non-limited desired gear ratio, and the maximum gear ratio rate of change. The commanded gear ratio is then changed to the current desired gear ratio using electronic signals at least in part by changing a displacement of one of the variable displacement pump 18 and the at least one variable displacement motors 22. Thus, the control strategy described herein provides a means for incrementally adjusting the commanded gear ratio toward the non-limited desired gear ratio by transitioning to current desired gear ratios based on pedal positions, as described herein. The control strategy provides a means for more smoothly controlling gear ratio changes in hydrostatic drive machines and, further, may allow the performance of the hydrostatic drive system to simulate torque converter operation.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

The invention claimed is:

1. A method of controlling a gear ratio rate of change in a machine having a continuously variable transmission, the method comprising steps of:
   moving an operator input device to a changed position;
   receiving electronic data indicative of the changed position;
   determining a non-limited desired gear ratio based at least in part on the changed position;
   selecting a maximum gear ratio rate of change corresponding to the changed position from an electronically stored gear ratio rate map;
   determining a current desired gear ratio based at least in part on the non-limited desired gear ratio and the maximum gear ratio rate of change; and
   changing a commanded gear ratio of the continuously variable transmission to the current desired gear ratio using electronic signals.

2. The method of claim 1, further including determining the current desired gear ratio based at least in part on the non-limited desired gear ratio, the maximum gear ratio rate of change, and a previous desired gear ratio.

3. The method of claim 2, further including:
   determining acceleration is indicated if the non-limited desired gear ratio is greater than the previous desired gear ratio; and
   determining deceleration is indicated if the non-limited desired gear ratio is less than the previous desired gear ratio.

4. The method of claim 3, further including:
   moving exactly one of an accelerator pedal and a decelerator pedal to the changed position; and
   selecting the maximum gear ratio rate of change corresponding to the changed position of the exactly one of the accelerator and decelerator pedals.

5. The method of claim 3, further including:
   moving an accelerator pedal to an accelerator changed position and moving a decelerator pedal to a decelerator changed position;
   receiving electronic data indicative of the accelerator and decelerator changed positions;
   determining the non-limited desired gear ratio based at least in part on the accelerator and decelerator changed positions;
   if acceleration is indicated and both of the accelerator and decelerator pedals command acceleration, selecting a higher rate of the maximum gear ratio rate of change corresponding to the accelerator pedal changed position and the maximum gear ratio rate of change corresponding to the decelerator pedal changed position;
   if acceleration is indicated and exactly one of the accelerator and decelerator pedals commands acceleration, selecting the maximum gear ratio rate of change corresponding to the exactly one of the accelerator pedal and decelerator pedal commanding acceleration; and
   determining the current desired gear ratio based at least in part on the non-limited desired gear ratio and the higher rate.

6. The method of claim 3, further including:
   moving an accelerator pedal to an accelerator changed position and moving a decelerator pedal to a decelerator changed position;
   receiving electronic data indicative of the accelerator and decelerator changed positions;
   determining the non-limited desired gear ratio based at least in part on the accelerator and decelerator changed positions;
   if deceleration is indicated and both of the accelerator and decelerator pedals command deceleration, selecting a higher rate of the maximum gear ratio rate of change corresponding to the accelerator pedal changed position and the maximum gear ratio rate of change corresponding to the decelerator pedal changed position;
   if deceleration is indicated and exactly one of the accelerator and decelerator pedals commands deceleration, selecting the maximum gear ratio rate of change corresponding to the exactly one of the accelerator pedal and decelerator pedal commanding deceleration; and
   determining the current desired gear ratio based at least in part on the non-limited desired gear ratio and the higher rate.

7. The method of claim 1, further including:
   selecting a scale factor corresponding to the changed position; and
   determining the non-limited desired gear ratio based on the scale factor and a maximum allowed gear ratio.

8. The method of claim 2, further including scaling the maximum gear ratio rate of change based on a difference between the non-limited desired gear ratio and the previous desired gear ratio.

9. The method of claim 1, further including:
   depressing an accelerator pedal to accelerate the machine and releasing the accelerator pedal to decelerate the machine; and
   for the accelerator pedal, providing maximum gear ratio rates of change in the gear ratio rate map that, for acceleration, increase as the accelerator pedal is depressed and that, for deceleration, decrease as the accelerator pedal is released.

10. The method of claim 1, further including:
depressing a decelerator pedal to decelerate the machine and releasing the decelerator pedal to accelerate the machine; and
for the decelerator pedal, providing maximum gear ratio rates of change in the gear ratio rate map that, for deceleration, increase as the decelerator pedal is depressed and that, for acceleration, increase as the decelerator pedal is released.

11. A machine having a continuously variable transmission, comprising:
a machine frame;
ground engaging propulsion elements coupled with the machine frame;
an internal combustion engine supported on the machine frame;
a continuously variable transmission coupled with the internal combustion engine and configured to drive the ground engaging elements;
an operator input device;
a memory storing a gear ratio rate map mapping maximum gear ratio rates of change to positions of the operator input device; and
an electronic controller including the memory and in communication with the operator input device and the continuously variable transmission, wherein the electronic controller receives electronic data indicative of a changed position of the operator input device, determines a non-limited desired gear ratio based at least in part on the changed position, selects a maximum gear ratio rate of change corresponding to the changed position from the gear ratio rate map, determines a current desired gear ratio based at least in part on the non-limited desired gear ratio and the maximum gear ratio rate of change, and changes a commanded gear ratio of the continuously variable transmission to the current desired gear ratio using electronic signals.

12. The machine of claim 11, wherein the electronic controller determines the current desired gear ratio based at least in part on the non-limited desired gear ratio, the maximum gear ratio rate of change, and a previous desired gear ratio.

13. The machine of claim 12, wherein the electronic controller:
determines acceleration is indicated if the non-limited desired gear ratio is greater than the previous desired gear ratio; and
determines deceleration is indicated if the non-limited desired gear ratio is less than the previous desired gear ratio.

14. The machine of claim 13, further including exactly one of an accelerator pedal and a decelerator pedal moved to the changed position, wherein the electronic controller selects the maximum gear ratio rate of change corresponding to the changed position of the exactly one of the accelerator and decelerator pedals.

15. The machine of claim 13, further including an accelerator pedal moved to an accelerator changed position and a decelerator pedal moved to a decelerator changed position, wherein the electronic controller:
receives electronic data indicative of the accelerator and decelerator changed positions;
determines the non-limited desired gear ratio based at least in part on the accelerator and decelerator changed positions;
if acceleration is indicated and both of the accelerator and decelerator pedals command acceleration, selects a higher rate of the maximum gear ratio rate of change corresponding to the accelerator pedal changed position and the maximum gear ratio rate of change corresponding to the decelerator pedal changed position;
if acceleration is indicated and exactly one of the accelerator and decelerator pedal commands acceleration, selects the maximum gear ratio rate of change corresponding to the exactly one of the accelerator pedal and decelerator pedal commanding acceleration; and
determines the current desired gear ratio based at least in part on the non-limited desired gear ratio and the higher rate.

16. The machine of claim 13, further including an accelerator pedal moved to an accelerator changed position and a decelerator pedal moved to a decelerator changed position, wherein the electronic controller:
receives electronic data indicative of the accelerator and decelerator changed positions;
determines the non-limited desired gear ratio based at least in part on the accelerator and decelerator changed positions;
if deceleration is indicated and both of the accelerator and decelerator pedals command deceleration, selects a higher rate of the maximum gear ratio rate of change corresponding to the accelerator pedal changed position and the maximum gear ratio rate of change corresponding to the decelerator pedal changed position;
if deceleration is indicated and exactly one of the accelerator and decelerator pedal commands deceleration, selects the maximum gear ratio rate of change corresponding to the exactly one of the accelerator pedal and decelerator pedal commanding deceleration; and
determines the current desired gear ratio based at least in part on the non-limited desired gear ratio and the higher rate.

17. The machine of claim 11, wherein the electronic controller:
selects a scale factor corresponding to the changed position; and
determines the non-limited desired gear ratio based on the scale factor and a maximum allowed gear ratio.

18. The machine of claim 12, wherein the electronic controller scales the maximum gear ratio rate of change based on a difference between the non-limited desired gear ratio and the previous desired gear ratio.

19. The machine of claim 11, wherein an accelerator pedal is depressed to accelerate the machine and released to decelerate the machine, and wherein the gear ratio rate map includes maximum gear ratio rates of change corresponding to the accelerator pedal that, for acceleration, increase as the accelerator pedal is depressed and that, for deceleration, decrease as the accelerator pedal is released.

20. The machine of claim 11, wherein a decelerator pedal is depressed to decelerate the machine and released to accelerate the machine, and wherein the gear ratio rate map includes maximum gear ratio rates of change corresponding to the decelerator pedal that, for deceleration, increase as the decelerator pedal is depressed and that, for acceleration, increase as the decelerator pedal is released.

* * * * *